United States Patent
Kleanthous et al.

(10) Patent No.: US 11,620,781 B1
(45) Date of Patent: Apr. 4, 2023

(54) SYSTEM AND METHOD FOR VIRTUAL CHARACTER LOCOMOTION

(71) Applicant: TAKE-TWO INTERACTIVE SOFTWARE, INC., New York, NY (US)

(72) Inventors: Tobias Kleanthous, Edinburgh (GB); Mike Jones, Edinburgh (GB); Chris Swinhoe, Edinburgh (GB); Arran Cartie, Edinburgh (GB); James Stuart Miller, New York, NY (US); Sven Louis Julia van Soom, Edinburgh (GB)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 47 days.

(21) Appl. No.: 17/079,164

(22) Filed: Oct. 23, 2020

Related U.S. Application Data

(60) Provisional application No. 62/926,274, filed on Oct. 25, 2019.

(51) Int. Cl.
*G06T 13/40* (2011.01)
*G06T 15/20* (2011.01)

(52) U.S. Cl.
CPC ............ *G06T 13/40* (2013.01); *G06T 15/205* (2013.01); *G06T 2213/12* (2013.01)

(58) Field of Classification Search
CPC .... G06T 13/40; G06T 15/205; G06T 2213/12
See application file for complete search history.

(56) References Cited

U.S. PATENT DOCUMENTS

| | | | | |
|---|---|---|---|---|
| 6,208,357 B1* | 3/2001 | Koga | ............... | G06T 13/40 345/473 |
| 8,228,336 B1* | 7/2012 | Dykes | ............... | G06T 15/06 345/473 |
| 2009/0091563 A1* | 4/2009 | Viz | ............... | G06T 13/40 345/419 |
| 2009/0179901 A1* | 7/2009 | Girard | ............... | G06T 13/40 345/474 |
| 2013/0222433 A1* | 8/2013 | Chapman | ............... | G06T 13/40 345/660 |
| 2015/0002516 A1* | 1/2015 | Frederickson | ............... | G06T 13/40 345/474 |
| 2019/0287288 A1* | 9/2019 | Guay | ............... | G06T 13/40 |

* cited by examiner

*Primary Examiner* — King Y Poon
*Assistant Examiner* — Vincent Peren
(74) *Attorney, Agent, or Firm* — Orrick, Herrington & Sutcliffe LLP

(57) ABSTRACT

A system and method for controlling the animation and movement of in-game objects. In some embodiments, the system includes one or more data-driven animation building blocks that can be used to define any character movements. In some embodiments, the data-driven animation blocks are conditioned by how their data is described separately from any explicit code in the core game engine. These building blocks can accept certain inputs from the core code system (e.g., movement direction, desired velocity of movement, and so on). But the game itself is agnostic as to why particular building blocks are used and what animation data (e.g., single animation, parametric blend, defined by user, and so on) the blocks may be associated with.

17 Claims, 4 Drawing Sheets

SYSTEM AND METHOD FOR VIRTUAL CHARACTER LOCOMOTION

CROSS-REFERENCE TO RELATED APPLICATIONS

This application claims priority to U.S. Provisional Application Ser. No. 62/926,274, filed on Oct. 25, 2019, the disclosure of the provisional application is hereby incorporated by reference in its entirety and for all purposes.

FIELD

The present disclosure relates generally to video games, including methods and systems to implement the same, and more specifically, but not exclusively, to systems and methods for efficiently rendering in-game objects, including characters, and controlling animation of characters and non-player characters.

BACKGROUND

Computer games often comprise a graphically rendered three-dimensional (3D) space that represents a virtual world in which the players play the game. This virtual world is typically filled with objects, e.g., characters, rooms, vehicles, items, and environments that are used to create the scene for the game. For example, a game set in a modern-day city would have a virtual world populated with objects like buildings, cars, people, etc. Similarly, a game set in medieval Europe might be populated with knights, serfs, castles, horses, etc. As the 3D spaces that these games inhabit have become larger and more complex, the task of controlling their motion has become challenging, both computationally and in terms of the effort required to design and individually manage the movement of a large variety of objects.

The way a character or a non-player character (NPC) moves around in the game world is one of the most important aspects of a smooth gaming experience and, often, is the foundation for all other animations added to the character. Fluid, responsive, and natural movements go unnoticed. However, jittery, slow, and unrealistic motions can take users out of the virtual experience and ruin an otherwise good game.

In game development, the problem of controlling the movement of the character or the NPC typically requires individual animation trees for each character to make them walk, run, and move in games. For example, a first animation tree is needed for a character to walk on a hill over some rocks. To get the character to walk on some stairs and face some object requires another animation tree. Individualized movements for various speeds, direction, curvature, surface texture, and so on require unique animation trees. In other words, the whole structure of an animation tree needs to be replicated for each additional movement. The same goes for any character beyond just human animation (e.g., animals, robots, and so on). As the 3D spaces that these games inhabit introduce more characters, this animation is difficult to scale.

In view of the foregoing, a need exists for an improved system for animating and controlling the motion of in-game objects in an effort to overcome the aforementioned obstacles and deficiencies of conventional video game systems.

Figure 1:
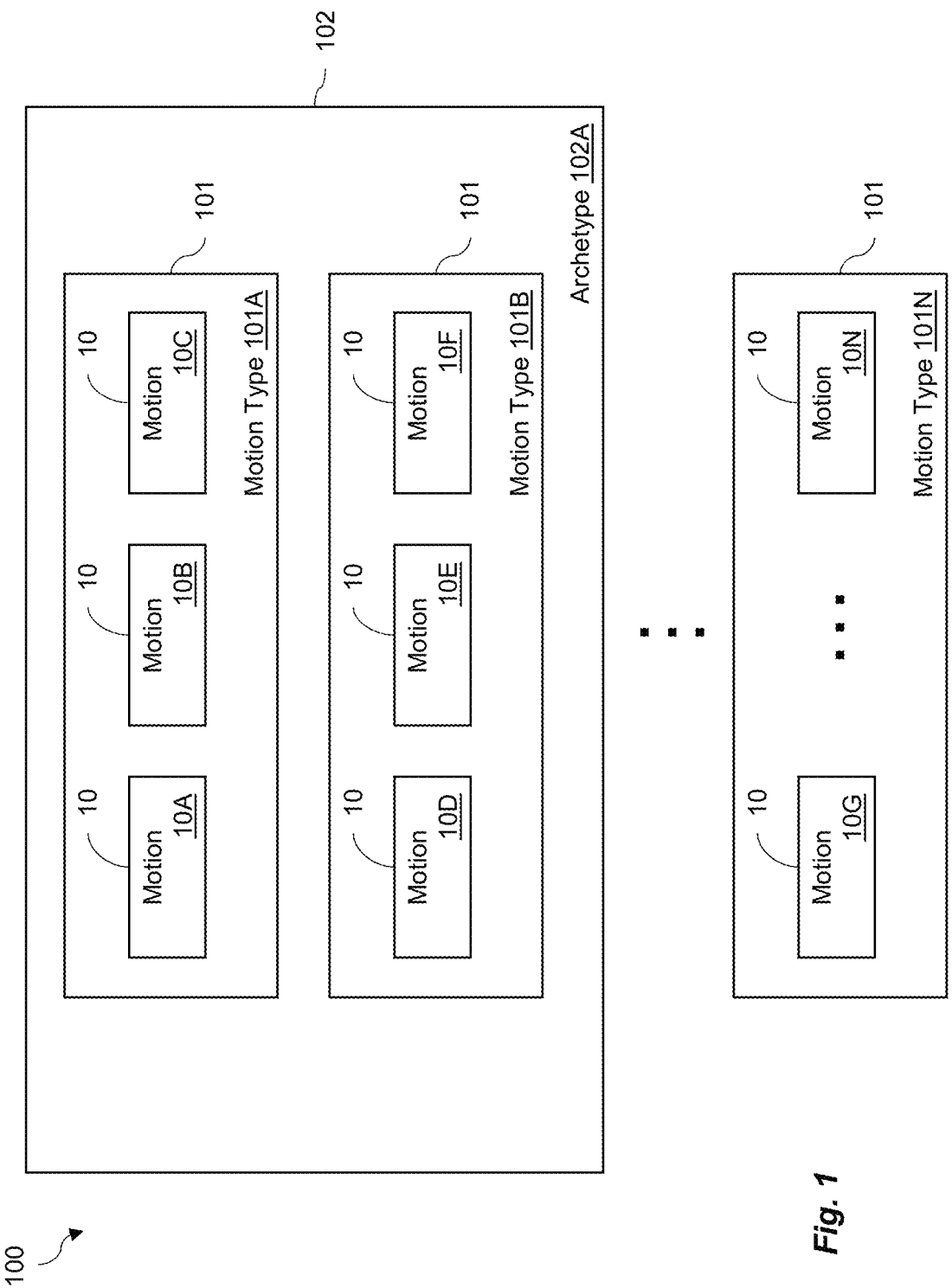
FIG. 1 is an exemplary schematic diagram illustrating one embodiment of the disclosed locomotion system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF PREFERRED EMBODIMENTS

Because conventional video game systems are difficult to scale for controlling a large number of individualized character movements, an improved video game system that can reduce the number of animations required for any number of characters can prove desirable and provide a way to introduce a variety of unique character movements without the additional computational complexity. This result can be achieved, according to one embodiment disclosed herein, by a locomotion system 100 as illustrated in FIG. 1. The locomotion system 100 advantageously enables flexibility for creating a large variety of animations for virtual worlds with a smaller set of stock resources and a more flexible code structure than traditional systems require.

In a traditional system, each character (or character type) needs to have an animation tree covering the various scenarios that character might encounter in the game. For example, the character requires a specific animation resource for walking naturally; it needs another specific animation resource for walking when fatigued; it needs another animation resource for walking through snow; and so on. For a large open world style game with a large number of characters, the game requires a large set of base animation resources. This large number of resources is not only difficult to create and maintain, but also uses a large amount of run-time memory resources. These constraints limit a game's ability to deliver a detailed, varied and immersive experience.

These problems are addressed by the disclosed locomotion system. Turning to FIG. 1, the locomotion system 100 includes one or more data-driven animation building blocks that can be used to define any character movements. In other words, the data-driven animation blocks advantageously are conditioned by how their data is described separately from any explicit code in the core game engine. These building blocks can accept certain inputs from the core code system (e.g., movement direction, desired velocity of movement, and so on). But the game itself is agnostic as to why particular building blocks are used and what animation data (e.g., single animation, parametric blend, defined by user, and so on) the blocks may be associated with. Similarly, the selection criteria for the building blocks can be defined/described separately from the game engine (e.g., is a given motion suitable for a walk, jog, run, or sprint; does the motion rely on certain conditions—such as health of a character; is the motion applicable when the character is looking a certain way, turning left versus right, slowing down, speeding up, landing on the ground, and so on). As shown, the locomotion system 100 includes one or more motions 10. All motions of a similar style can be characterized in a logical parent component, shown as one or more motion types 101. Similarly, all motion types 101 of a common style can be wrapped in a logical parent element, shown as an archetype 102.

The archetype 102 can define the full range of full body and upper body motion types 101 (or styles) that are available to a given character. In other words, any style that the character can choose from at a given point is defined by the motion types 101 that are available in the selected archetype 102 (e.g., whether by a local definition or using a fallback described herein). In some embodiments, the archetype 102 generally describes the default style of the particular character. Often, the archetype 102 remains the same throughout the game. But the selection criteria for the motion types 101 of the archetype 102 alters the character's response to different environmental stimuli or changing gameplay situations (e.g., combat, exertion, and so on).

Typically, a selected character will have one archetype 102 that defines all relevant motion types 101 required for its particular animation in a game. However, those of ordinary skill in the art will recognize that situations can arise where it would be advantageous to have a single character adopt more than one archetype 102 to easily control the respective collections of motion types 101, as desired. By way of example, a player character can have a first suite of animations consistent with the character's default/neutral behaviors. But, as the game story develops, the character might be put into situations where the default/neutral behavior animation is not suitable. For example, at certain parts of the game the character might have exerted a lot of energy and be tired. As a further example, the weather in the game environment might be rainy, cold, or snowy. As a further example, the character might be injured. As a further example, the character might be carrying a heavy burden. In these situations, to provide a more realistic game, the character's animation style should advantageously change to reflect these changed character states to provide and provide a more realistic game.

Returning to FIG. 1, motions 10 are the smallest component of the locomotion system 100. The motions 10 are individualized building blocks of a character's movement. By way of example, typical motions 10 for a character include idle, idle turns, walk, run, walk start, walk stop, and so on. In a preferred embodiment, all motions 10 can be defined by a common set of attributes (not shown). Additional examples of motions 10 are described with reference to the motion types 101 herein.

In some embodiments, the attributes can include a gait condition, properties, events, flags, graph, values, references, and motion variants. All motions can define the gait—or character's manner of walking—conditions which they cover. For example, loops can include a walk/jog, stops can include a sprint/run stop, starts can include a sprint/run start, gait transitions can include a sprint/run and a moving transition to a walk, and so on.

The properties attribute can define a clip set that is used by the selected motion, an overloadable animation blend tree to be used for a given motion, named additional clips within specific clip sets, parametric blends from sets that can be named, a Boolean (e.g., "can modulate speed?") that specifies whether play speed of the animation can be modified, a minimum speed, and a maximum speed—both speeds can be defined by a float value. The events attribute can include user-defined strings that can be passed back to the game whenever a motion blends in or out. The locomotion system 100 further supports these events being fired by listening to arbitrary tagging of times in animation or parametric blends to allow for precise timing control of their activation. For example, the desired time to activate a certain physical control of movement for sliding down a steep terrain/gravel can be controlled in this manner. Flags can include other Booleans to be set if a condition (e.g., a nearest foot fall is left strike on entering the motion) is true. Graphs define the default move graph defined by a particular motion.

Developers can also define custom float (or other type) values that are passed as resident to the parametric blend and/or animation tree for a given motion.

Similarly, custom references can be added to values stored on a character's blackboard (discussed below with reference to FIG. 2). Motion variants can also be custom defined. By way of example, motion variants can include a motion idle, a motion idle turn, a motion start, a motion stop, a motion moving, a motion moving transition, a motion moving turn, a motion single step, and so on.

Additionally and/or alternatively, these building block motions 10 can be layered to create a data-driven animation system of discrete components that create locomotion. For example, the component motions 10 can be managed in collections of common styles known as motion types 101. In other words, motion types 101 can represent a set of motions 10 of a common style or type. The motion style 101 advantageously represents a high-level description state for a character, rather than a specific move. By way of example, a motion type 101 of "drunk" can define several motions 10 that are commonly used to animate a character who is drunk. Other examples of motion types 101 include "normal," "sick," "injured," "carrying," "weapon walking," and so on.

The motion types 101 can advantageously define the character's subset of motions 10. For example, when the motion type 101 changes from "dry land" to "swamp," the motions 10 of the character can describe different responses to water height (e.g., walk_start_knee_deep, walk_start_shoulder_deep, and so on). In another example, a fatally wounded character can change to a motion type of "critically injured shoulder," within which, a specialized stop motion 10 that results in the character collapsing to the ground and dying can be animated (e.g., walk_stop_collapse).

Archetypes 102 are the highest-level component of a character's locomotion. In some embodiments, a selected archetype 102 represents a collection of motion types 101. For example, an archetype can be created called "Bob" that is assigned to a particular walking model character. The archetype 102 of "Bob" can include one or more motion types 101, such as "Bob Normal," "Bob Injured," "Bob with a weapon," Bob drunk with a weapon," and so on.

Archetypes 102 are typically named and condition-less collections of motion types 101 and transitions (described further below). Selected archetypes 102 are usually created for a given character or a class of characters.

In some embodiments, an archetype 102 includes a default motion type 101, which advantageously enables a load time dependency and a safe fallback should motion searches ever fail completely. For example, turning to FIG. 2, an exemplary data flow for executing the animation building blocks of the locomotion system 100 is shown. As described herein, the locomotion system 100 advantageously reduces computational complexity by initially processing one or more archetypes 102. The archetype 102 defines the set of motions, including motion types 101 for modeling a character's locomotion.

Archetypes 102 can also include predefined fallbacks in the event that motion types 101 are undefined for a particular character. In other words, the locomotion system 100 can support fallbacks (not shown) wherein an archetype can derive a motion type 101 from a designated archetype. Additionally, the fallbacks can be defined in a way that prevents selected motion types 101 or motions 10 from being inherited independent of their validity for a selected archetype. By way of example, assume archetype A has a motion type C and falls back to archetype B having motion types C', D, and E. In archetype A, as no replacements for motion types D and E are present, the implementations of motion types D and E from the archetype B can be inherited verbatim (following the same criteria for selection when using the archetype B) with no additional developer work to use them. Similarly, for the motion type C, any remaining motions that have not been replaced can be gathered from the motion type C', thereby alleviating the need to specify where or when replacements or specializations are made.

Figure 2:
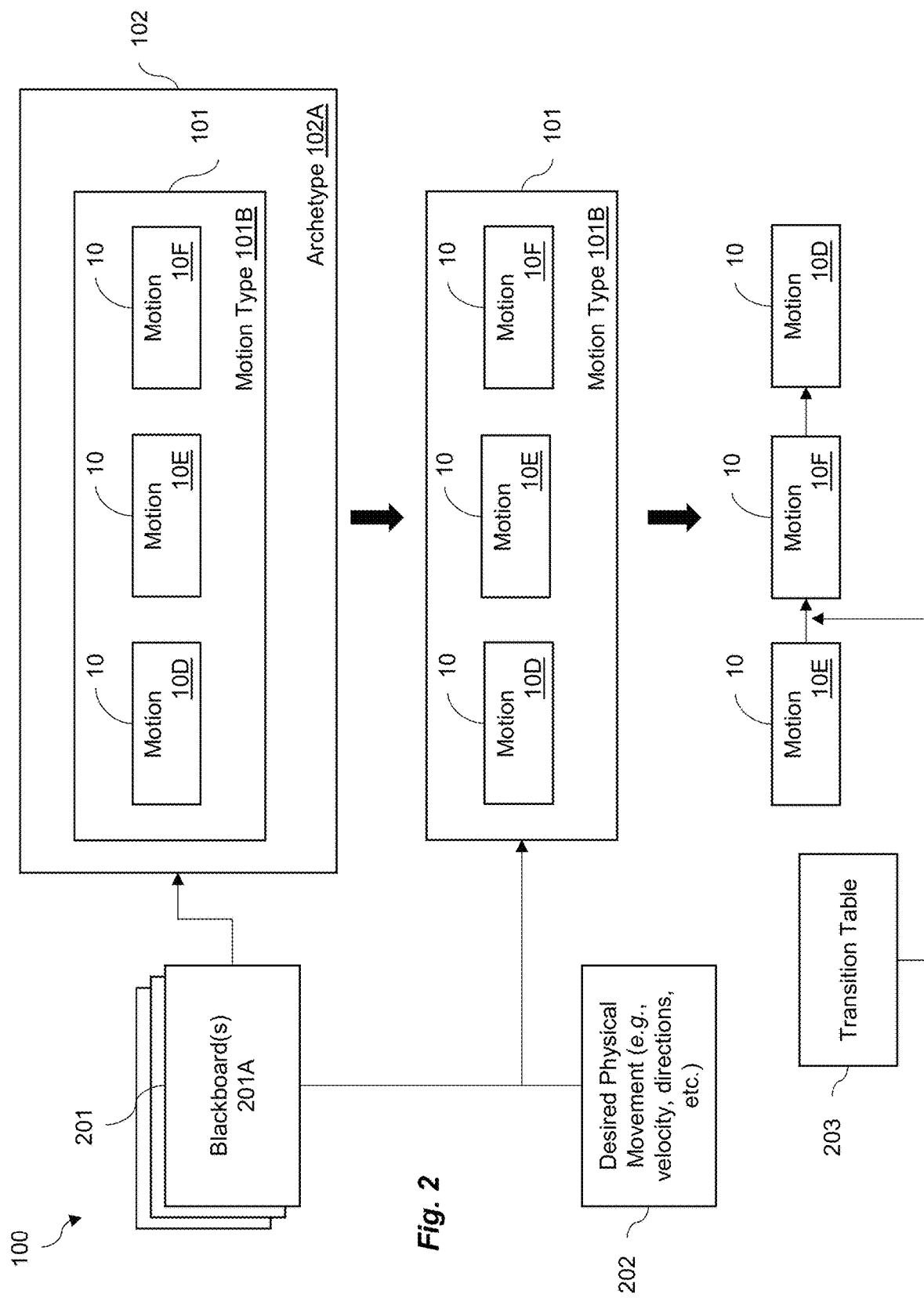
FIG. 2 is an exemplary data flow diagram illustrating one embodiment of a process for executing an animation using the building blocks of the locomotion system of FIG. 1.

In some embodiments, the default motion type 101 can be "normal." However, as shown in FIG. 2, developers can override this default as desired (via a variable provided by code and/or script separate from a desired physical movement). In other words, the default can be a developer defined variable of the archetype 102 separate to physical input or can be determined using a desired physical movement 202.

Additionally and/or alternatively, developers can also set variables to a character's blackboard 201 and allow the locomotion system 100 to choose the appropriate motion type 101 for a particular situation. In some embodiments, the blackboard 201 is a specialized and central location where various game systems—in code or mission scripts—can communicate relevant information with the locomotion system 100 without direct knowledge of its internal behavior or implementation. This advantageously enables communication between game data without the need for tight coupling of selected game systems. Other core game components include immutable data, which can then be used by an individual instance within which an individual character's blackboard is created. As such, although the motion types 101, archetypes 102, and so on represent data provided externally to the game engine, the blackboard 201 is driven by the core engine and not defined in data.

By way of example, a selected character's blackboard can specify the current weather, temperature, geolocation, and so on that can affect the character's locomotion. These blackboard variables can be used to select and/or modify additional motion types 101 and motions 10 from the archetype 102 of the character—subject to any additional fallbacks as shown in FIG. 2. In the example shown in FIG. 2, using data from the character's blackboard 201A, the motion type 101B for the character (and the motions 10D, 10E, and 10F) are selected for animation. For example, assume the motion 10D represents an "injured:walk_start"; the motion 10E represents a "crouch:run_stop"; and the motion 10F represents a "injured:crouch_to_stand." As shown in FIG. 2, the motions are sequenced by the desired physical movement 202, the transition table 203, and the input from the blackboard 201 to yield the sequence of motions: "crouch:run_stop"→"injured:crouch_to_stand"→"injured:walk_start". It should be noted that the notation used above to show the motions 10 and motion types 101 can indicate ownership of motions 10 by various motion types 101. For example, "crouch: *" and "injured: *" can indicate that motions that follow the notation are owned by the motion types of "crouch" and "injured", respectively.

Based on the defined desired physical movements 202 (e.g., velocity, directions, and so on), motions 10D, 10E, and 10F are sequenced with additional input from a transition table 203 (described below) and input from the blackboard 201A. In some embodiments, the desired physical movements 202 are collected from explicit code in the core game engine.

In some embodiments, a key identifies the property or variable in the blackboard. The key can refer to a human readable name associated with given datum on the blackboard to advantageously provide human readable semantics of why an item exists and its purpose in the locomotion system 100.

In some embodiments, a selected blackboard can be persistent or facilitate a character's locomotion during a predetermined number of animation frames. For example, a persistent blackboard can be used for time-independent variables, such as a light clothing type. A temporary blackboard can define transitory conditions, such as whether the character is in water.

As described herein, although the archetype 102 for a particular character remains the same throughout the game, the selection criteria for the motion types 101 of the archetype 102 alters the character's response to different environmental stimuli or changing gameplay situations (e.g., combat, exertion, and so on). In a preferred embodiment, the character's blackboard can function as an arbiter of the information that is used to condition and select the different motion types 101 of the archetype 102 for the particular character.

With respect to archetypes 102 that represent the upper body of a character and their motion types 101, the archetypes can additionally specify details such as the index or ordering of layering used on top of the full body for reducing the complexity in handling the vast number of additional permutations that might occur with the entire full body animation. The archetype 102 can also define synchronizing behavior with layers of animation below. For example, parts of an animated skeleton can be specified for replacement with a pistol holding animation. The archetype 102 can detail how that is to be layered above a motion that poses the spine and shoulders for looking in a direction and that it should be synchronized against the footsteps of the full body walk cycle underneath to ensure coherent looking posing.

Additionally and/or alternatively, the locomotion system 100 can support fallbacks (not shown) to prevent an archetype 102 from selecting certain motion types 101. In some embodiments, the archetypes 102 can provide partial or wholesale replacements for motion types 101 that are character specific. By way of example, in an ordinary style of movement, a first character in the game (e.g., "Tim") can have a distinct flavor in their neutral movement compared to a second or third character (e.g., "Tom" or "Steve") and, thus, each character will define their own archetype(s) 102. However, in some cases, it can be beneficial to assign a generic archetype describing large groups (e.g., "male" or "female") for background pedestrians with no relationship to the story.

Accordingly, the fallback behavior is particularly advantageous for characters to inherit motion types 101 where there is no value in creating unique motion types 101 (e.g., wading through snow or a swamp or only replacing the core walk cycle for Tom, but sharing Steve's motions for running). Specifically, a character's motion types 101 can be inherited through multiple layers of supporting archetypes 102. For exemplary purposes, this might take the form of:

Human→male→cowboy

Human→female→Sally

Human→male→cowboy→sheriff

In some embodiments, the locomotion system supports one or more controllers (not shown). Multiple controllers can be attached to an archetype 102, which controllers describe the way physical movement is calculated by the game engine (not shown). Controllers can include parameters for desired ranges of speed, acceleration behavior, and so on, and can enumerate one or more implementations for a style of movement in the game engine (e.g., denoting using code defined for horse movement versus a human where the movement is manipulated differently—for example, a horse controller may prioritize adding lateral movement alongside controlling angular velocity whereas a human is only initially going to sidestep before turning).

In some embodiments, a series of extensible markup language (XML)-based meta files advantageously can be used to define the building blocks and characteristics of the locomotion system 100. The XML structure can be parsed by the locomotion system 100 at runtime to cooperate with general and/or object orientated structures used in the game engine. The data structures can further be converted to game-ready binary formats in the development pipeline. The data for the system can be created as a composition of small components to prevent monolithic and unreadable data.

With reference again to FIG. 2, in some embodiments, the locomotion system 100 can include transition tables 203 to enable more explicit control over the relationship between motions. The transition tables 203 can define permissions, rate of blend, synchronization, and filtering (e.g., how certain components of the character's skeleton are blended over the transition window) between motion types 101 and their constituent motions. Usage can be described explicitly in detail for very fine control and/or using wildcards to accommodate general relationships (e.g., defaulting a higher blend time for all transitions in snow motion compared to ordinary movement). In other examples, blend times can be set for specific cases (e.g., the blend between a normal:run and a crouch:run). The transition table 203 can also define prohibited or permitted transitions between motion types, thereby enabling the developers to block certain motions 10 without the need for the explicit definition in the animation code. For a given motion type 101, entries can be listed coming from any number of other named types and within each entry, the name of the motion 10 that the entry is coming from can be named. Accordingly, a list of named motions with blend times and a list of motions that can be permitted or prohibited can be provided.

The locomotion system 100 selects applicable filters to apply on transitions. The applicable filters with the sync behavior, permission, and duration from the transition tables can be used to modify transitions.

Figure 3:
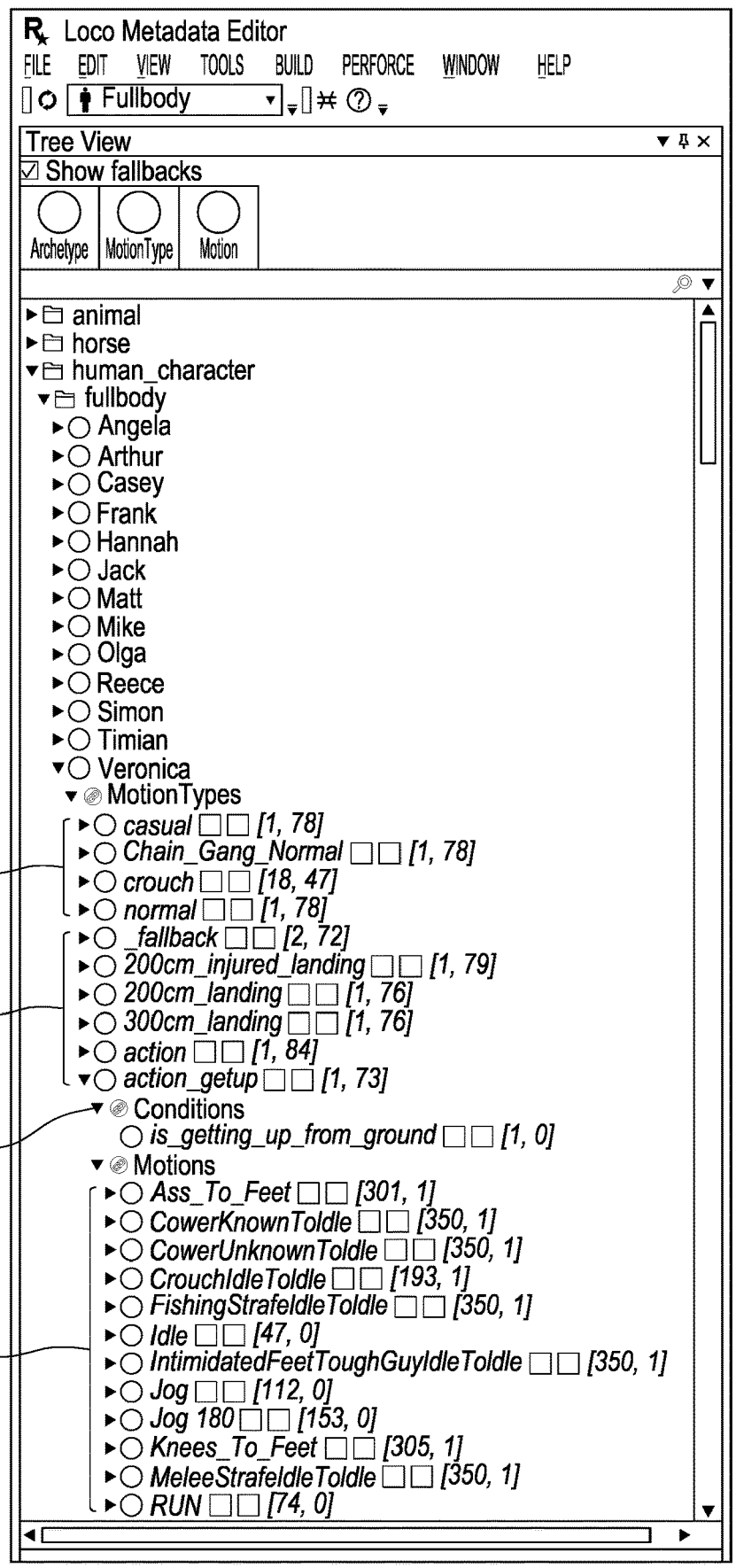
FIG. 3 is an exemplary diagram illustrating one embodiment of a user interface for in-game development using the locomotion system of FIG. 1.

Additionally and/or alternatively, the locomotion system 100 can provide an in-game graphical user interface (GUI), such as shown in FIG. 3, for real-time development using the building blocks described herein. With reference to FIG. 3, unique motion types 101 are expanded for a character "Veronica." Inherited motion types 101 from a fallback archetype 102 (e.g., female) is shown. The developer can also select criteria 301 for selection of a particular motion type 102 (e.g., "action_getup") and the constituent motions 10 of the motion type 102 is shown.

Figure 4:
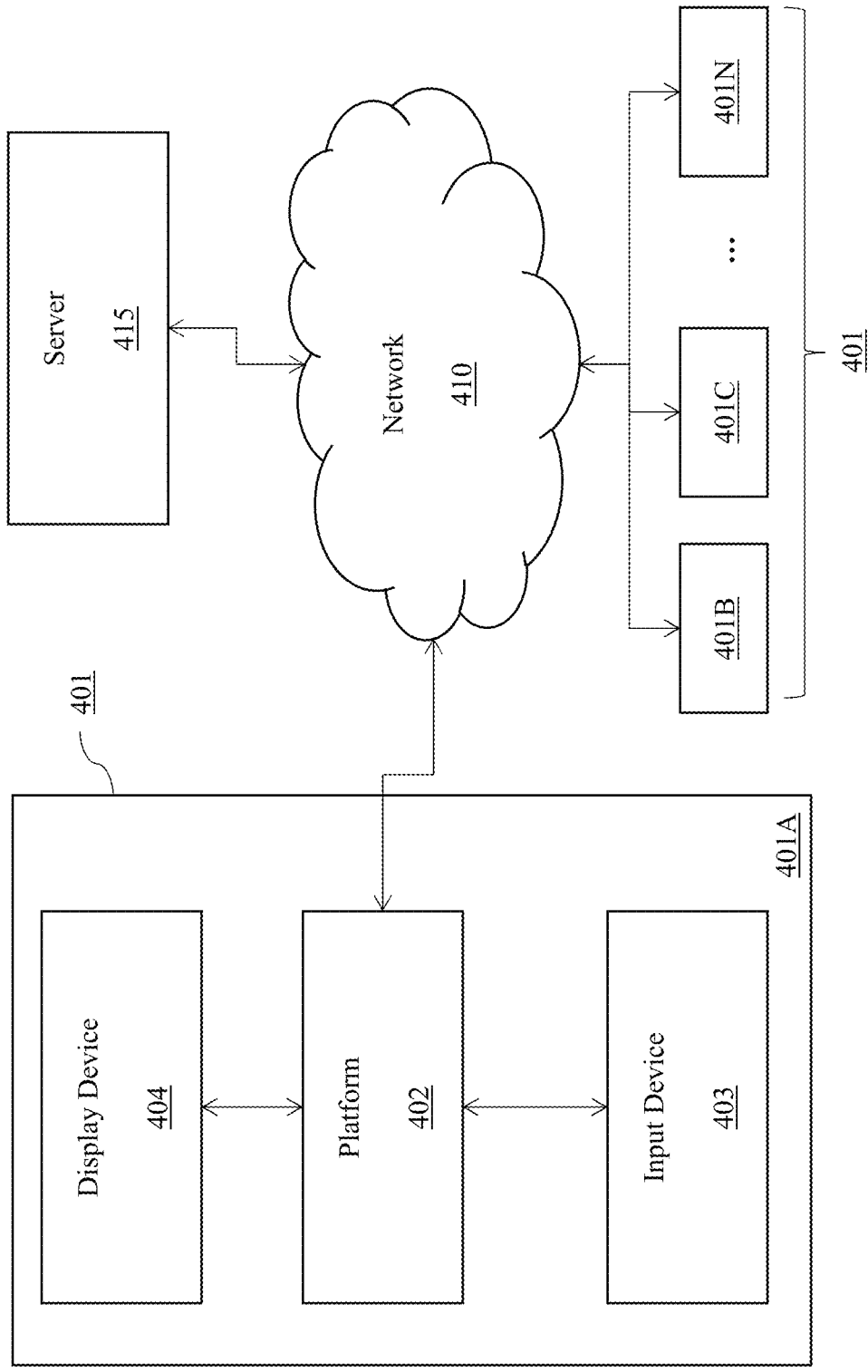
FIG. 4 is an exemplary top-level block diagram illustrating one embodiment of a network multiplayer gaming environment including at least one peer device for implementing the locomotion system of FIG. 1.

Turning to FIG. 4, the locomotion system 100 can be implemented between a network 410 (e.g., cloud) comprising a server 415 (e.g., a single server machine, multiple server machines, and/or a content delivery network) communicating with a plurality of player consoles 401 (shown as any number of player consoles 401A-401N). A player console 401 can be any system with a processor, memory, capability to connect to the network, and capability of executing gaming software in accordance with the disclosed embodiments. A hardware and network implementation suitable for the disclosed system is described in greater detail in commonly assigned U.S. Pat. No. 9,901,831, entitled "System and Method for Network Gaming Architecture," incorporated herein by reference.

The player console 401A is shown in further detail for illustration purposes only. As shown, the player console 401 can include any number of platforms 402 in communication with an input device 403. For example, the platform 402 can represent any biometrics, motion picture, video game, medical application, or multimedia platform as desired. According to one embodiment disclosed herein, the platform 402 is a gaming platform for running game software and various components in signal communication with the gaming platform 402, such as a dedicated game console including an XBOX One® manufactured by Microsoft Corp., PLAYSTATION 4® manufactured by Sony Corporation, and/or WII U® manufactured by Nintendo Corp. In other embodiments, the platform 402 can also be a personal computer, laptop, tablet computer, or a handheld mobile device. One or more players can use a gaming platform to participate in a game. Multiple gaming platforms may be linked together locally (e.g., via a LAN connection), or via the network 410 (e.g., the Internet or other communication networks).

The network 410 can also include any number of wired data networks and/or any conventional wireless communication network, for example, radio, Wireless Fidelity (Wi-Fi), cellular, satellite, and broadcasting networks. Exemplary suitable wireless communication technologies used with the network 410 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The platform 402 typically is electrically coupled to a display device 404. For example, the display device 404 can be an output device for presentation of information from the platform 402 and includes a television, a computer monitor, a head-mounted display, a broadcast reference monitor, a medical monitor, the screen on a tablet or mobile device, and so on. In some embodiments, the platform 402 and/or the display device 404 is in communication with an audio system (not shown) for presenting audible information.

In FIG. 4, the platform 402 also is electrically or wirelessly coupled to one or more controllers or input devices, such as an input device 403. In some embodiments, the input device 403 is a game controller and includes keyboards, mice, gamepads, joysticks, directional pads, analog sticks, touch screens, and special purpose devices (e.g., steering wheels for driving games and/or light guns for shooting games). Additionally and/or alternatively, the input device 403 includes an interactive-motion-tracking system, such the Microsoft Xbox One KINECT® device or the Sony PlayStation® 4 (or 5) Camera, for tracking the movements of a player within a 3-dimensional physical space. The input device 403 provides data signals to the platform 402, which processes the data and translates the player's movements on the display device 404. The platform 402 can also perform various calculations or operations on inputs received by the sensor and instruct the display to provide a visual representation of the inputs received as well as effects resulting from subsequent operations and calculations.

In one embodiment, the platform 402 can be connected via the network 410 to the server 415 that can host, for example, multiplayer games and multimedia information (e.g., scores, rankings, tournaments, and so on). Users can access the server 415 when the platform 402 is online via the network 410. Reference herein to the platform 402 can include gaming platforms executing video game software or game software (e.g., computer program products, tangibly embodied in a computer-readable storage medium). Additionally and/or alternatively, references to the platform 402 can also include hardware only, or a combination of hardware and/or software. In some embodiments, the platform 402 includes hardware and/or software, such as a central processing unit, one or more audio processors, one or more graphics processors, and one or more storage devices.

In some embodiments, a selected player console 401A-N can execute a video game that includes animation of one or more virtual players in a virtual world and at least one non-player object (NPC). NPCs can include, for example, cars, boats, aircrafts, and other vehicles in the virtual world. The virtual world can include game spaces with these NPCs and player characters that are animated using the systems and methods described herein.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

The invention claimed is:

1. A locomotion system for controlling animation of a character in a three-dimensional (3D) virtual environment comprising:
a rendering engine;
a core system logic communicatively coupled to the rendering engine for executing core game logic of the virtual environment;
one or more motion animation blocks for describing individualized building blocks of the character's movement, each motion animation block being described by a set of attributes;
one or more motion type blocks for encapsulating a collection of the motion animation blocks that share a common style, each motion type block defining the character's subset of motion animation blocks;
one or more archetype blocks for encapsulating a common set of motion type blocks; and
a blackboard that is driven by the core system logic and can provide additional selection criteria of at least one motion animation block based on a selected archetype block for the character,
wherein the motion animation blocks, the motion type blocks, and the archetype blocks are functionally independent from the core game logic.

2. The locomotion system of claim 1, wherein a key identifies one or more variables of the blackboard, the key comprising a human readable name associated with the variables to provide the selection criteria.

3. The locomotion system of claim 1, wherein the core game logic defines one or more desired physical movements to sequence the motion type objects blocks.

4. The locomotion system of claim 1, wherein a selected archetype block defines a fallback archetype block, the fallback archetype block defining at least one new motion animation block or motion type block not present in the selected archetype block and inheriting any remaining motion type blocks and motion animation blocks from the selected archetype block.

5. The locomotion system of claim 1, wherein a selected archetype block defines the character's default animation.

6. The locomotion system of claim 1, wherein a selected archetype block of the character is unique from a second archetype block of a second character and at least one motion type block is common across the character and the second character.

7. The locomotion system of claim 1, wherein at least one of the motion animation blocks, the motion type blocks, and the archetype blocks is defined by a series of extensible markup language (XML)-based meta files.

8. The locomotion system of claim 1, wherein a selected attribute of a selected motion animation block includes at least one of a clip set that is used by a selected motion of the character, an overloadable animation blend tree to be used for the selected motion, named additional clips within specific clip sets, parametric blends from sets that can be named, a Boolean that specifies whether play speed of the selected motion can be modified, a minimum speed, and a maximum speed.

9. The locomotion system of claim 1, wherein the attributes of the motion animation block are custom float values.

10. The locomotion system of claim 1, further comprising one or more transition tables to control a relationship between motion animation blocks.

11. The locomotion system of claim 1, further comprising an in-game graphical user interface for real-time modification of at least one of the motion animation blocks, the motion type blocks, and the archetype blocks.

12. A computer-implemented method for controlling animation of a character in a three-dimensional (3D) virtual environment comprising:
executing core game logic to render the virtual environment using a core system logic communicatively coupled to a rendering engine; and
animating the character in the virtual environment via the rendering engine, wherein said animating comprises:
receiving one or more desired physical movements from the core game logic; and
identifying an archetype block associated with the character, the archetype block encapsulating a common set of motion type blocks, each motion type block encapsulating a collection of one or more motion animation blocks that share a common style, each motion type block defining the character's subset of motion animation blocks, each motion animation block describing individualized building blocks of the character's movement, each motion animation block being described by a set of attributes, the desired physical movements sequencing the motion type blocks, wherein the motion animation blocks, the motion type blocks, and the archetype blocks are functionally independent from the core game logic, and wherein said animating the character further comprises receiving one or more motion variants from a blackboard, each motion variant providing an additional selection criterion of at least one motion animation block based on a selected archetype block for the character.

13. The computer-implemented method of claim 12, wherein said animating the character further comprises identifying a second archetype block, the common set of motion type blocks and the motion animation blocks of the second archetype block altering the animation of the character as a game story defined by the core game logic develops.

14. The computer-implemented method of claim 12, wherein said animating the character further comprises identifying a fallback archetype block of the archetype block, the fallback archetype block defining at least one new motion animation block or motion type block not present in the selected archetype block and inheriting any remaining motion type blocks and motion animation blocks from the selected archetype block.

15. A computer program product for controlling animation of a character in a three-dimensional (3D) virtual environment, the computer program product including a non-transitory computer readable storage medium having program instructions embodied therewith, the program instructions executable by a device to cause the device to perform a method comprising:

executing core game logic to render the virtual environment using a core system logic communicatively coupled to a rendering engine; and animating the character in the virtual environment via the rendering engine, wherein said animating comprises:

receiving one or more desired physical movements from the core game logic; and identifying an archetype block associated with the character, the archetype block encapsulating a common set of motion type blocks, each motion type block encapsulating a collection of one or more motion animation blocks that share a common style, each motion type block defining the character's subset of motion animation blocks, each motion animation block describing individualized building blocks of the character's movement, each motion animation block being described by a set of attributes, the desired physical movements sequencing the motion type blocks, wherein the motion animation blocks, the motion type blocks, and the archetype blocks are functionally independent from the core game logic, and wherein said animating the character further comprises receiving one or more motion variants from a blackboard, each motion variant providing an additional selection criterion of at least one motion animation block based on a selected archetype block for the character.

16. The computer program product of claim 15, wherein said animating the character further comprises identifying a second archetype block, the common set of motion type objects blocks and the motion animation blocks of the second archetype block altering the animation of the character as a game story defined by the core game logic develops.

17. The computer program product of claim 15, wherein said animating the character further comprises identifying a fallback archetype block of the archetype block, the fallback archetype block defining at least one new motion animation block or motion type block not present in the selected archetype block and inheriting any remaining motion type objects blocks and motion animation blocks from the selected archetype block.

\* \* \* \* \*